Patented Dec. 25, 1945

2,391,683

UNITED STATES PATENT OFFICE 2,391,683

REACTION PRODUCTS OF ALDEHYDES AND DIAZINE DERIVATIVES

Gaetano F. D'Alelio and James W. Underwood, Pittsfield, Mass., assignors to General Electric Company, a corporation of New York No Drawing. Application October 12, 1942, Serial No. 461,770

3 Claims. (Cl. 260—72)

This invention relates to the production of new synthetic materials and especially to new reaction products having particular utility in the plastics and coating arts. Specifically the invention is concerned with compositions of matter comprising the resinous reaction product of (1) a chlorinated acetamide with (2) the product of partial reaction of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a diazine derivative corresponding to the following general formula:

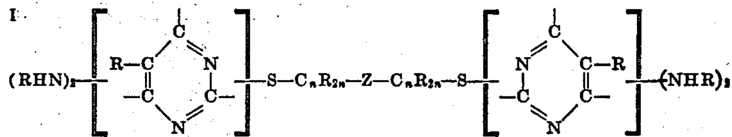

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and Z represents a member of the class consisting of oxygen and sulfur.

This application is a continuation-in-part of our copending application Serial No. 456,929, filed September 1, 1942, and assigned to the same assignee as the present invention.

Illustrative examples of radicals that R in Formula I may represent are: aliphatic (e. g., methyl, ethyl, propyl, isopropyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R represents hydrogen, in which case the compounds may be represented by the general formula:

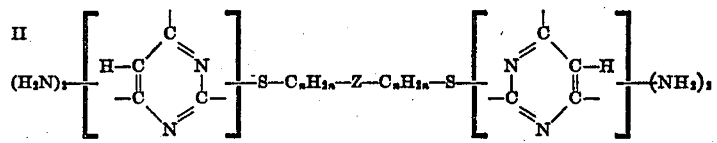

where $n$ and Z have the same meanings as given above with reference to Formula I. However, there also may be used in carrying the present invention into effect diazine derivatives such as those represented by the general formula:

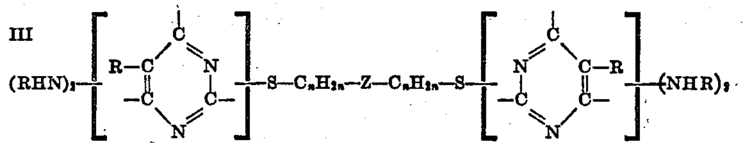

where $n$, R and Z have the same meanings as given above with reference to Formula I.

Instead of the pyrimidine (1,3- or meta-diazine) compounds represented by the above formulas, corresponding derivatives of the 1,2- or ortho-diazines (pyridazines) or of the 1,4- or para-diazines (pyrazines) may be used.

The diazine derivatives that are used in carrying the present invention into effect are more fully described and are specifically claimed in our copending parent application Serial No. 456,929. As pointed out in this copending application, a method of preparing the diazine derivatives used in practicing the present invention comprises effecting reaction in the presence of a hydrohalide acceptor, e. g., an alkali-metal hydroxide, between (1) a mercapto pyrimidine corresponding to the general formula

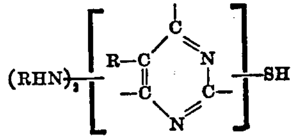

where R has the meaning above given with reference to Formula I, and (2) a di-(haloalkyl) ether corresponding to the general formula

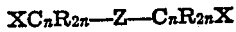

$$XC_nR_{2n}—Z—C_nR_{2n}X$$

where X represents a halogen atom, specifically a chlorine atom, and $n$, Z and R have the same meanings as given above with reference to Formula I, the reactants being employed in the ratio of at least two mols of the mercapto pyrimidine of (1) per mol of the di-(haloalkyl) ether of (2).

Specific examples of bis-(diazinyl thio) dialkyl ethers and thioethers, more particularly bis-(pyrimidyl thio) dialkyl ethers and thioethers, which also may be named bis-(pyrimidyl thio alkyl) ethers and thioethers, that are embraced by Formula I and that may be used in producing our new compositions are listed below:

Beta,beta'-bis-(4,6-diamino pyrimidyl-2 thio) diethyl ether, which also may be named bis-[beta-(4,6-diamino pyrimidyl-2 thio) ethyl] ether
Beta,beta'-bis-(2,6-diamino pyrimidyl-4 thio) diethyl ether
Beta,beta'-bis-(4,6-diamino pyrimidyl-2 thio) diethyl thioether
Beta,beta'-bis-(4,6-diamino pyrimidyl-2 thio) ethyl isopropyl ether
Beta,beta'-bis-[4,6-di-(methylamino) pyrimidyl-2 thio] diethyl ether
Beta,beta'-bis-(4,6-diamino pyrimidyl-2 thio) dipropyl ether
Beta,beta'-bis-(4,6-diamino pyrimidyl-2 thio) di-isopropyl ether
Beta,beta'-bis-(2,6-diamino pyrimidyl-4 thio) dipropyl ether
Beta,beta'-bis-(2,6-diamino pyrimidyl-4 thio) di-isopropyl ether
Beta,beta'-bis-[2,6-di-(methylamino) pyrimidyl-4 thio] diethyl ether
Beta,beta'-bis-[4,6-di-(ethylamino) pyrimidyl-2 thio] diethyl ether
Beta,beta'-bis-[4,6-di-(propenylamino) pyrimidyl-2-thio] diethyl ether
Beta,beta'-bis-[4,6-di-(isobutylamino) pyrimidyl-2-thio] diethyl ether
Beta,beta'-bis-(4,6-dianilino pyrimidyl-2-thio) diethyl ether
Beta,beta'-bis-(4,6-dianilino pyrimidyl-2 thio) diethyl thioether
Beta,beta'-bis-[4,6-di-(methylamino) pyrimidyl-2 thio] diethyl thioether
Beta,beta'-bis-(4,6-ditoluido pyrimidyl-2 thio) diethyl ether
Beta,beta'-bis-(4,6-dixylidino pyrimidyl-2 thio) diethyl ether
Beta,beta'-bis-(4,6-ditoluido pyrimidyl-2 thio) diethyl thioether
Beta,beta'-bis-(4,6-diamino 5-methyl pyrimidyl-2 thio) diethyl ether
Beta,beta'-bis-(2,6-diamino 5-ethyl pyrimidyl-4-thio) diethyl thioether
Beta,beta'-bis-[4,6-di-(phenethylamino pyrimidyl-2-thio] diethyl ether
Beta,beta'-bis-[4,6-di-(ethylanilino) pyrimidyl-2 thio] diethyl ether
Beta,beta'-bis-(4,6-diamino 5-phenyl pyrimidyl-2 thio) diethyl ether
Beta,beta'-bis-[4,6-di-(methylamino) 5-ethyl pyrimidyl-2 thio]diethyl ether
Bis-(4,6-diamino pyrimidyl-2 thio) dimethyl ether
Bis-(2,6-diamino pyrimidyl-4 thio) dimethyl ether
Bis-(4,6-diamino pyrimidyl-2 thio) dimethyl thioether
Bis-(2,6-diamino pyrimidyl-4 thio) dimethyl thioether
Bis-(4,6-diamino 5-methyl pyrimidyl-2 thio) dimethyl ether
Bis-(2,6-diamino 5-phenyl pyrimidyl-4 thio) dimethyl thioether
Bis-[4,6-di-(methylamino) pyrimidyl-2 thio] dimethyl ether
Bis-(4,6-dianilino pyrimidyl-2 thio) dimethyl ether
Bis-(4-methylamino 6-anilino pyrimidyl-2 thio) dimethyl ether
Alpha,beta'-bis-(4,6-diamino pyrimidyl-2 thio) methyl ethyl ether
Alpha,alpha'-bis-(4,6-diamino pyrimidyl-2 thio) diethyl ether
Alpha,alpha'-bis-(2,6-diamino pyrimidyl-4 thio) diethyl ether
Alpha,alpha'-bis-(4,6-diamino pyrimidyl-2 thio) diethyl thioether
Alpha,alpha'-bis-(2,6-diamino pyrimidyl-4 thio) diethyl thioether
Alpha,alpha'-bis-(4,6-diamino pyrimidyl-2 thio) dipropyl ether
Alpha,alpha'-bis-(4,6-diamino pyrimidyl-2 thio) propyl butyl ether
Alpha,beta'-(4,6-diamino pyrimidyl-2 thio) buten-3'-yl butyl ether
Beta,beta'-bis-[4,6-di-(fluoroanilino) pyrimidyl-2 thio] diethyl ether
Beta,beta'-bis-(4,6-diamino 5-chloromethyl pyrimidyl-2 thio) beta,beta'-diphenyl diethyl ether
Alpha,alpha'-bis-[4,6-di-bromotoluido) pyrimidyl-2 thio] dipropyl ether
Alpha,beta'-bis-(4,6-diamino 5-iodomethyl pyrimidyl-2 thio) diethyl ether
Alpha,beta'-bis-(4-methylamino 6-chloroethylamino pyrimidyl-2 thio) beta-phenyl alpha-ethyl dibutyl thioether
Beta,beta'-bis-[4,6-di-(cyclohexenylamino) pyrimidyl-2 thio] diethyl ether
Beta,beta'-bis-[4,6,-di-(allylamino) 5-allyl pyrimidyl-2 thio] dipropyl thioether
Beta,beta'-bis-[2,6-di-(naphthylamino) 5-xenyl pyrimidyl-4 thio] diethyl thioether
Beta,beta'bis-[4,-di-(octylamino) 5-chlorophenyl pyrimidyl-2 thio] diethyl ether
Beta,beta'-bis-[4,6-di-(chloroanilino) 5-butyl pyrimidyl-2 thio] diethyl thioether
Beta,beta'-bis-[2,6-di-(iodotoluido) 5-iodophenyl pyrimidyl-4 thio] dipropyl ether
Beta,beta'-bis-[4,6-di-(cyclohexylamino) 5-cycylohexyl pyrimidyl-2 thio] diethyl ether The present invention is based on our discovery that new and valuable materials having particular utility in the plastics and coating arts can be produced by effecting partial reaction between ingredients comprising essentially an aldehyde, including polymeric aldehydes, hydroxyaldehydes and aldehyde-addition products, and a diazine derivative of the kind embraced by Formula I, numerous examples of which have been given above and in our copending application Serial No. 456,929. Thereafter a curing reactant, specifically a chlorinated acetamide, is caused to react with this partial reaction product.

In the production of molded articles from molding compositions comprising a filled or an unfilled thermosetting resin, it is highly desirable that the molding compound have a high plastic flow during molding combined with a rapid cure to an insoluble, infusible state. Surprisingly it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. The cured resins of the present invention also have a high resistance to heat and abrasion and, therefore, are especially suitable for use where optimum heat- and abrasion-resistance are properties of primary importance.

It has been suggested heretofore that resinous condensation products be made by condensing an aliphatic aldehyde containing not more than four carbon atoms with a compound corresponding to the general formula

IV

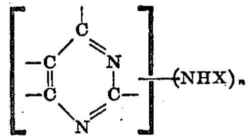

wherein $n$ is at least 2, X stands for a member of the group consisting of H and $-NH_2$ and wherein to the carbon atoms are attached members of the class consisting of the aforesaid —NHX groups, hydrogen, alkyl, phenyl, phenylene, hydroxy, alkoxy, mercapto, thioether and substituted amino groups. Although such resins have valuable properties and are suitable for many applications, their water resistance and degree of cure are often inadequate for many electrically insulating uses and other applications of the cured resin or of molded articles made from molding compositions containing the thermosetting resin. Furthermore, the plasticity of the heat-curable resin and of molding compounds prepared therefrom often is unsatisfactory for molding many articles, particularly articles of intricate design the successful molding of which requires high plasticity of the molding compound during molding in order that the compound will flow rapidly and uniformly to all parts of the mold. These and other disadvantages in the materials of the above-mentioned class are avoided by using as a starting reactant a diazine derivative of the kind embraced by Formula I.

The diazine derivatives used in practicing the present invention are not to be confused with, and are not the equivalent of, bisthioammeline polyalkylene ethers having the general formula

V

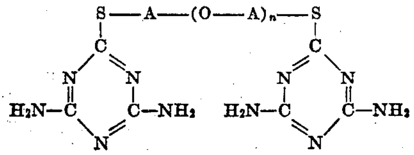

wherein A represents a lower alkylene group having at least two carbon atoms and $n$ represents a small integer, specifically from 1 to 5. Examples of lower alkylene groups represented by A in Formula V are

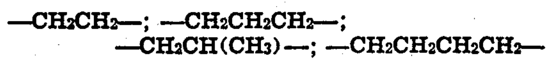

$-CH_2CH_2-$; $-CH_2CH_2CH_2-$; $-CH_2CH(CH_3)-$; $-CH_2CH_2CH_2CH_2-$ etc. Condensation products of an aldehyde, specifically formaldehyde, with triazine derivatives of the kind embraced by Formula V, likewise are not to be confused with, and are not the equivalent of, condensation products of an aldehyde, specifically formaldehyde, with a diazine derivative of the kind embraced by Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxide, sodium, potassium or lithium carbonate, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence or absence of solvents or diluents, fillers, other natural or synthetic resinous bodies, or while admixed with other materials that also can react with the aldehydic reactant or with the diazine derivative, e. g., urea, thiourea, selenourea and iminourea (guanidine), substituted ureas, thioureas, selenoureas and iminoureas, more particularly urea derivatives such as mentioned, for example, in D'Alelio Patent No. 2,285,418, page 1, column 1, lines 41–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines including aromatic amines, e. g., aniline, etc.; and the like.

The modifying reactants may be incorporated with the diazine derivative to form an intercondensation product by mixing all the reactants and effecting condensation therebetween or by various permutations of reactants as described, for example, in D'Alelio Patent No. 2,281,559, issued May 5, 1942, with particular reference to reactions involving a non-haloacylated urea, a haloacylated urea and an aliphatic aldehyde. For example, we may form a partial condensation product of ingredients comprising (1) urea or melamine or urea and melamine, (2) a diazine derivative of the kind embraced by Formula I, for instance a bis-(diamino pyrimidyl thio) diethyl ether, a bis-(diamino pyrimidyl thio) diethyl thioether, a beta, beta'-bis-(diamino pyrimidyl thio) dipropyl ether, etc., and (3) an aldehyde, including polymeric aldehydes, hydroxyaldehydes and aldehyde-addition products, e. g., formaldehyde, paraformaldehyde, aldol, dimethylol urea, etc. Thereafter, we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated plywood and other laminated articles, and for numerous other purposes. The liquid heat-hardenable or potentially heat-hardenable condensation products also may be used directly as casting resins, while those which are of a gel-like nature in partially condensed state may be dried and granulated to form clear, unfilled, heat-convertible resins.

In order that those skilled in the art better may understand how the present invention may be carried into effect, the following examples are given by way of illustration and not by way of limitation. All parts are by weight.

*Example 1*

| | Parts |
|---|---|
| Beta,beta'-bis-(4,6 - diamino pyrimidyl-2-thio) diethyl ether | 35.4 |
| Aqueous formaldehyde (approx. 37.1% HCHO) | 40.5 |
| Sodium hydroxide in 2 parts water | 0.04 |
| Water | 50.0 |
| Chloroacetamide (monochloroacetamide) | 0.4 |

All of the above ingredients with the exception of the chloroacetamide were heated together under reflux at the boiling temperature of the mass for 10 minutes. The chloroacetamide was now added and heating under reflux was continued for an additional 3 minutes. The resulting resinous syrup, which had a pH of 7.82, was mixed with 22.1 parts alpha cellulose in flock form and 0.2 part of a mold lubricant, specifically zinc stearate, to form a molding (moldable) composition. The wet molding compound was dried at 60° C. for several hours. A sample of the dried and ground molding compound was molded for 3 minutes at 135° C. under a pressure of 2,000 pounds per square inch. The molded article was well cured throughout and had a well-knit and homogeneous structure. The molded piece withstood high temperatures better than molded articles similarly prepared from molding compositions containing a urea-formaldehyde resin. The molded article also had good water resistance. The molding compound showed excellent plastic flow during molding as evidenced by the amount of flash on the molded piece.

Instead of using chloroacetamide in accelerating the curing of the potentially reactive resinous material, heat-convertible compositions may be produced by adding to the partial condensation product (in syrupy or other form), e. g., N-diethyl chloroacetamide, di- and tri-chloroacetamides.

*Example 2*

| | Parts |
|---|---|
| Beta,beta'-bis-(4,6 - diamino pyrimidyl-2 thio) diethyl ether | 10.6 |
| Urea | 7.2 |
| Aqueous formaldehyde (approx. 37.1% HCHO) | 40.5 |
| Sodium hydroxide in 1.5 parts water | 0.03 |
| Water | 50.0 |
| Chloroacetamide | 0.3 |

All of the above ingredients with the exception of the chloroacetamide were heated together under reflux at the boiling temperature of the mass for 15 minutes. The chloroacetamide was now added and heating under reflux was continued for an additional 5 minutes. The resulting resinous syrup had a pH of 7.76. A molding compound was prepared by mixing this syrup with 16.1 parts alpha cellulose and 0.2 part zinc stearate. The wet molding composition was dried as described under Example 1. A well-molded product was obtained by molding a sample of the dried and ground molding compound for 3 minutes at 135° C. under a pressure of 2000 pounds per square inch. The molding compound showed excellent flow characteristics during molding.

*Example 3*

Same as Example 2 with the exception that the resinous syrup was prepared from a mixture of components which included 1.9 parts of aqueous ammonia (approx. 28% $NH_3$) in addition to the ingredients and proportions thereof given in Example 2. The molded article prepared from the molding compound containing the resinous syrup was well cured throughout and had excellent cohesive characteristics. The molding composition flowed exceptionally well during molding.

*Example 4*

| | Parts |
|---|---|
| Beta,beta'-bis-(4,6-diamino pyrimidyl-2-thio) diethyl ether | 26.6 |
| Para-amino benzene sulfonamide | 12.9 |
| Aqueous formaldehyde (approx. 37.1% HCHO) | 40.5 |
| Sodium hydroxide in 2 parts water | 0.04 |
| Water | 50.0 |
| Chloroacetamide | 0.4 |

All of the above ingredients with the exception of the chloroacetamide were heated together under reflux at the boiling temperature of the mass for 12 minutes, after which the chloroacetamide was added and refluxing at boiling temperature was continued for an additional 5 minutes. The resulting resinous syrup, which had a pH of 7.31, was mixed with 23.3 parts alpha cellulose and 0.2 part zinc stearate to form a molding compound. The wet molding composition was dried as described under Example 1. A sample of the dried and ground molding composition was molded for 3 minutes at 135° C. under a pressure of 2,000 pounds per square inch. The molded piece was well cured throughout and had a well-knit and homogeneous structure. The molding compound showed good plasticity during molding.

*Example 5*

| | Parts |
|---|---|
| Beta,beta'-bis-(4,6-diamino pyrimidyl-2 thio) diethyl ether | 35.4 |
| Dimethylol urea (commercial grade, containing approx. 11% by weight of water) | 53.5 |
| Sodium hydroxide in 2.5 parts water | 0.05 |
| Water | 100.0 |
| Chloroacetamide | 0.5 |

All of the above ingredients with the exception of the chloroacetamide were heated together under reflux at boiling temperature for 15 minutes. The above-stated amount of chloroacetamide was now added and heating under reflux was continued for an additional 3 minutes. The resinous syrup produced in this manner had a pH of 7.85. It was mixed with 29.3 parts alpha cellulose and 0.2 part zinc stearate to form a molding compound. The wet molding composition was dried as described under Example 1. A well-molded piece having excellent cohesive characteristics was obtained by molding a sample of the dried and ground molding compound for 3 minutes at 135° C. under a pressure of 2,000 pounds per square inch. The plasticity of the molding compound during molding was excellent.

The dimethylol urea in the above formula may be replaced in whole or in part by an equivalent amount of other aldehyde-addition products, for example by a polymethylol melamine such, for instance, as trimethylol melamine, hexamethylol melamine, etc.

*Example 6*

| | Parts |
|---|---|
| Beta,beta'-bis-(4,6-diamino pyrimidyl-2 thio) diethyl ether | 26.5 |
| Acrolein | 21.0 |
| Sodium hydroxide in 1.3 parts water | 0.025 |
| Water | 10.0 |

were mixed together, the acrolein being added last. The resulting solution was heated under reflux at boiling temperature for 15 minutes, at the end of which period of time a resin precipitated from the solution. When a sample of this resin was heated on a 140° C. hot plate in the absence of a curing agent, it exhibited a moderately quick cure to an infusible mass. The curing of the resin to an insoluble and infusible state is accelerated by the addition of a small amount of chloroacetamide, followed by the application of heat. The resinous material of this example may be used in the production of molding compounds.

*Example 7*

| | Parts |
|---|---|
| Beta,beta'-bis-(4,6-diamino pyrimidyl-2 thio) diethyl ether | 26.5 |
| Butyl alcohol | 27.9 |
| Aqueous formaldehyde (approx. 37.1% HCHO) | 30.5 |
| Sodium hydroxide in 2 parts water | 0.04 |

were heated together under reflux at the boiling temperature of the mass for 15 minutes. The resulting resinous syrup was potentially heat-curable as shown by the fact that when a small amount of chloroacetamide was added to the initial syrupy condensation product or to the dehydrated syrup, followed by heating on a 140° C. hot plate, the material cured to an insoluble and infusible state. The dehydrated syrup was soluble in ethyl alcohol, ethylene glycol and Solvatone but was insoluble, or substantially so, in water and benzene. Samples of the initial resinous syrup, both in unmodified state and modified by the addition of a small amount of an acid, specifically hydrochloric acid, as a curing agent, were applied to glass plates and the coated plates were baked for several hours at 60° C. The unmodified syrup yielded a baked film that was hard, transparent and water-resistant, and adhered tightly to the glass surface. The hydrochloric acid-modified syrup gave a baked film that was hard, opaque, water-resistant and uniformly patterned. This film also adhered tightly to the glass surface. The solubility and film-forming characteristics of the resinous material of this example make it particularly suitable for use in the preparation of liquid coating compositions.

*Example 8*

| | Parts |
|---|---|
| Beta,beta'-bis-(4,6-diamino pyrimidyl-2 thio) diethyl ether | 26.5 |
| Acetamide | 4.4 |
| Aqueous formaldehyde (approx. 37.1% HCHO) | 48.6 |
| Sodium hydroxide in 2 parts water | 0.04 |

were heated together under reflux at the boiling temperature of the mass for 15 minutes, yielding a resinous syrup that was potentially heat-curable as shown by the fact that when chloroacetamide was incorporated into the syrup, followed by heating on a 140° C. hot plate, the syrup was converted into a cured or insoluble and infusible state.

*Example 9*

| | Parts |
|---|---|
| Beta,beta'-bis-(4,6-diamino pyrimidyl-2 thio) diethyl ether | 26.5 |
| Diethyl malonate | 12.0 |
| Aqueous formaldehyde (approx. 37.1% HCHO) | 48.6 |
| Sodium hydroxide in 2 parts water | 0.04 |

were heated together under reflux at the boiling temperature of the mass for 15 minutes, yielding a resinous syrup that cured slowly to an infusible mass when a small sample of it was heated on a 140° C. hot plate. The addition of a small amount of chloroacetamide to the resinous syrup, followed by heating on a 140° C. hot plate, caused the resin to cure rapidly to an insoluble and infusible state.

*Example 10*

| | Parts |
|---|---|
| Beta,beta'-bis-(4,6-diamino pyrimidyl-2 thio) diethyl ether | 26.5 |
| Glycerine | 6.9 |
| Aqueous formaldehyde (approx. 37.1% HCHO) | 48.6 |
| Sodium hydroxide in 2 parts water | 0.04 |

were heated together under reflux at the boiling temperature of the mass for 15 minutes. The resulting resinous syrup was potentially heat-curable as shown by the fact that when chloroacetamide was added to the syrupy condensation product, followed by heating on a 140° C. hot plate, the syrup was converted into an insoluble and infusible resin. A glass plate was coated with a sample of the syrup containing a small amount of an acid, specifically hydrochloric acid, as a curing agent. The coated plate was heated at 60° C. for several hours. The baked film was hard and transparent, and adhered tightly to the glass surface. The resinous material of this example may be used in the preparation of various coating and impregnating compositions. For example, it may be used as a modifier of varnishes of the aminoplast and alkyd-resin types. It also may be employed as a modifier of other aminoplasts and compatible synthetic resins having unsatisfactory flow characteristics to improve their plasticity.

*Example 11*

| | Parts |
|---|---|
| Beta,beta'-bis-(4,6-diamino pyrimidyl-2 thio) diethyl ether | 26.5 |
| Polyvinyl alcohol | 3.4 |
| Aqueous formaldehyde (approx. 37.1% HCHO) | 48.6 |
| Sodium hydroxide in 2 parts water | 0.04 |

were heated together under reflux at the boiling temperature of the mass for 15 minutes. A small amount of an acid, specifically hydrochloric acid, was incorporated into a small sample of the resinous syrup produced in this manner, after which the modified syrup was heated on a 140° C. hot plate. The syrup was converted at this temperature into an insoluble and infusible resin. Portions of the initial syrupy condensation product, both with and without a small amount of hydrochloric acid as a curing agent, were applied to glass plates and the coated plates were baked for several hours at 60° C. The hydrochloric acid-modified syrup yielded a baked film that was harder than the baked film of the unmodified syrup. Both films were opaque and water-resistant. In each case the baked film adhered tightly to the glass surface. The resinous material of this example may be used in the preparation of various coating and impregnating compositions or it may be employed in the production of molding compounds.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 11, inclusive, at boiling temperature under reflux, the reaction between the components may be carried out at lower temperatures, for example at temperatures ranging from room temperature to a temperature near the boiling temperature, using longer reaction periods and, in some cases, stronger catalysts and higher catalyst concentrations.

It also will be understood by those skilled in the art that our invention is not limited to condensation products obtained by reaction of ingredients comprising an aldehyde and the specific diazine derivative named in the above illustrative examples. Thus, instead of beta,beta'-bis-(4,6-diamino pyrimidyl-2 thio) diethyl ether, we may use, for example, beta,beta'-bis-(4,6-diamino pyrimidyl-2 thio) diethyl thioether, beta,-beta'-bis-(2,6-diamino pyrimidyl-4 thio) diethyl ether or thioether, alpha,alpha'-bis(4,6-diamino pyrimidyl-2 thio) diethyl ether or thioether, alpha,alpha'-bis-(2,6-diamino pyrimidyl-4 thio) diethyl ether or thioether, alpha,beta'-bis-(4,6-diamino pyrimidyl-2 thio) diethyl ether or thioether, alpha,beta'-bis-(2,6-diamino pyrimidyl-4 thio) diethyl ether or thioether, beta,beta'-bis-(4,6-diamino pyrimidyl-2 thio) dipropyl ether or thioether, beta,beta'-bis-(2,6-diamino pyrimidyl-4 thio) dipropyl ether or thioether, or any other compound of the kind embraced by Formula I, numerous examples of which have been given above and in our copending application Serial No. 456,929.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N- carbinol) derivatives of the aminotriazoles, of the aminotriazines, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending upon the particular starting reactants employed and the particular properties desired in the finished product. Ordinarily these reactants are employed in an amount corresponding to at least one mol of the aldehyde, specifically formaldehyde, for each mol of the diazine derivative. Thus, we may use, for example, from 1 to 12 or 15 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 25 or 30 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., monohydric alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, succinonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products, aminotriazole-aldehyde condensation products, triaminopyrimidine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, wood veneer, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition comprising the resinous reaction product of (1) a chlorinated acetamide and (2) a product of partial reaction of ingredients including formaldehyde and a compound corresponding to the general formula

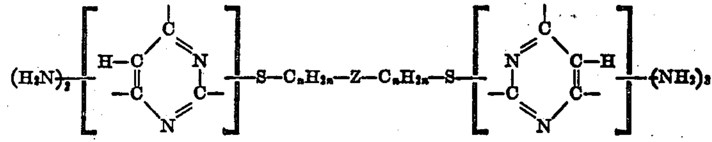

where $n$ represents an integer and is at least 1 and not more than 2, and Z represents a member of the class consisting of oxygen and sulfur.

2. A composition comprising the resinous reaction product of (1) a chlorinated acetamide and (2) a product of partial reaction of ingredients including formaldehyde and a bis-(diamino pyrimidyl thio) diethyl ether.

3. A composition comprising the resinous reaction product of (1) chloroacetamide and (2) a product of partial reaction, under alkaline conditions, of ingredients including formaldehyde and beta,beta'-bis-(4,6-diamino pyrimidyl-2 thio) diethyl ether.

GAETANO F. D'ALELIO.
JAMES W. UNDERWOOD.

Certificate of Correction

Patent No. 2,391,683. December 25, 1945.

GAETANO F. D'ALELIO ET AL.

It is hereby certified that errors appear in the printed specification of the above numbered patent requiring correction as follows: Page 2, first column, lines 57, 59 and 60, for "2-thio" read *2 thio*; and second column, line 1, after "phenethylamino" insert a closing parenthesis; line 2, for "2-thio" read *2 thio*; line 48, before "bromo-toluido" insert an opening parenthesis; line 61, for "beta'bis-[4,-di" read *beta'-bis-[4,6-di*; page 4, second column, line 13, and page 5, first column, line 18, for "2-" read *2*; page 6, second column, line 36, for "-bis" read *-bis-*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.*